Feb. 18, 1941.   F. MARASSO   2,231,934
COMBINED DIVIDER AND ROUNDER
Filed Jan. 25, 1940   3 Sheets-Sheet 1
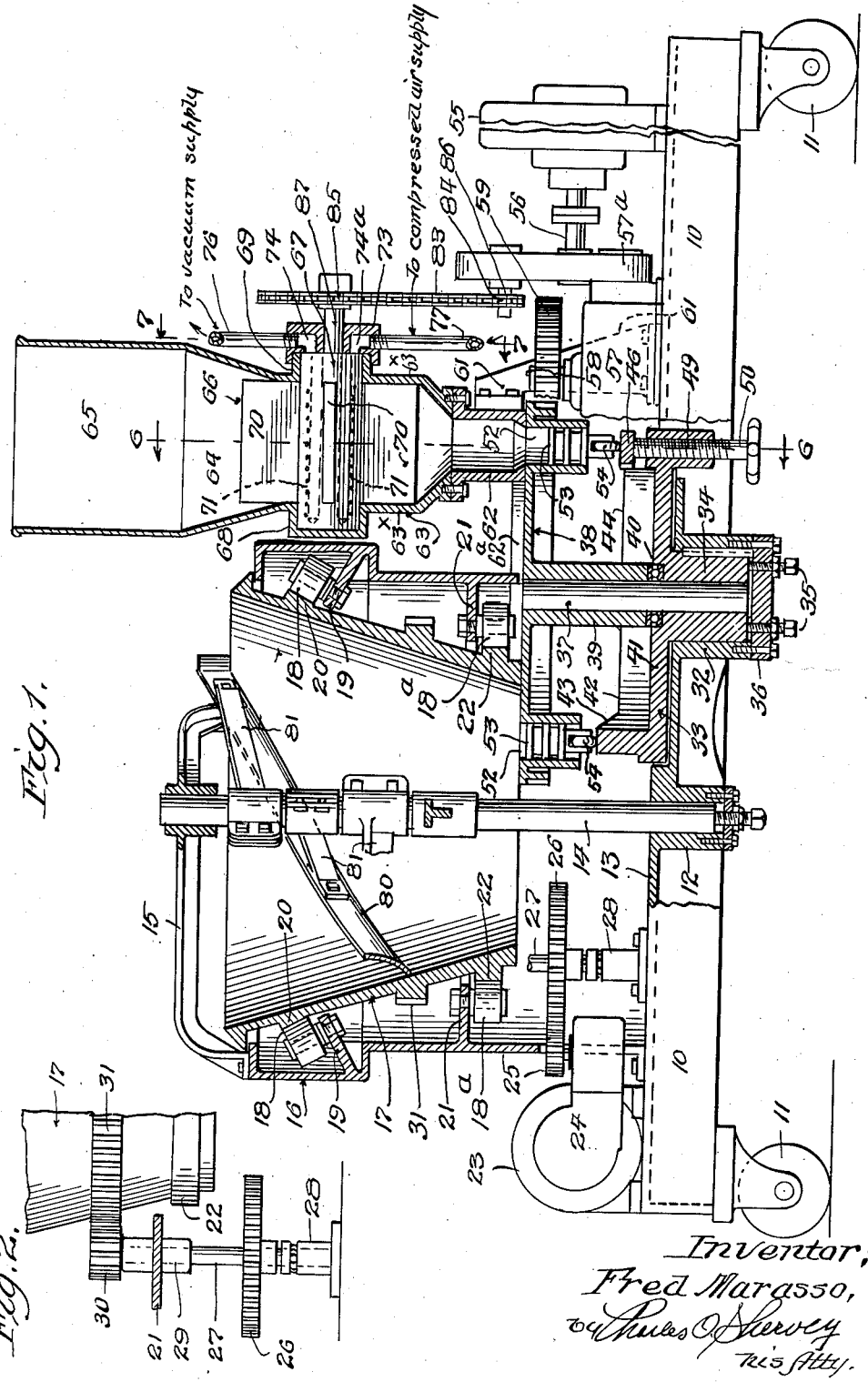
Inventor;
Fred Marasso,
by Charles O. Hervey
His Atty.

Feb. 18, 1941.                F. MARASSO                2,231,934
                       COMBINED DIVIDER AND ROUNDER
                         Filed Jan. 25, 1940         3 Sheets-Sheet 2
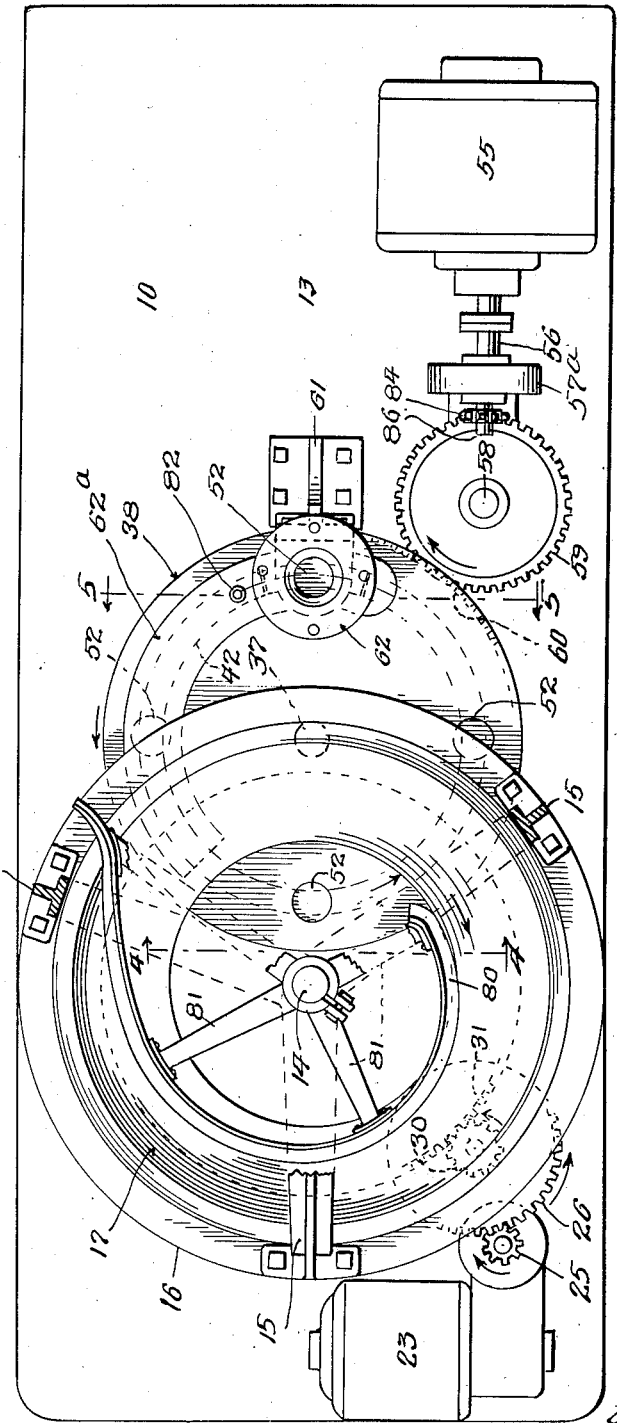
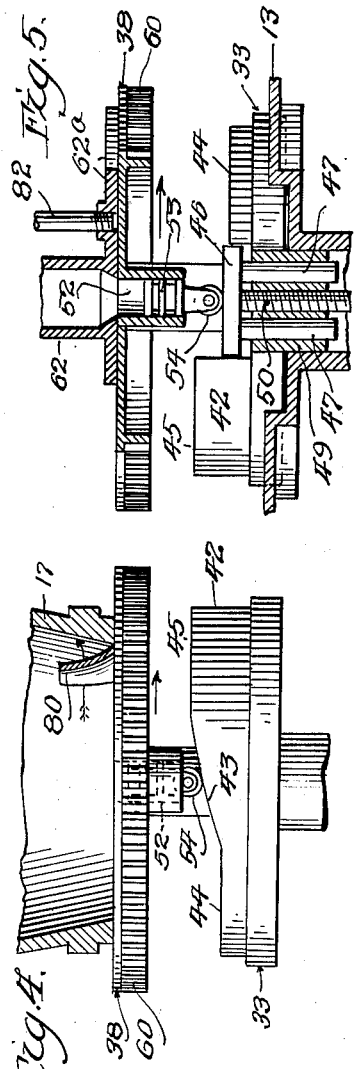
Inventor:
Fred Marasso.
By Charles O. Survey
his Atty.

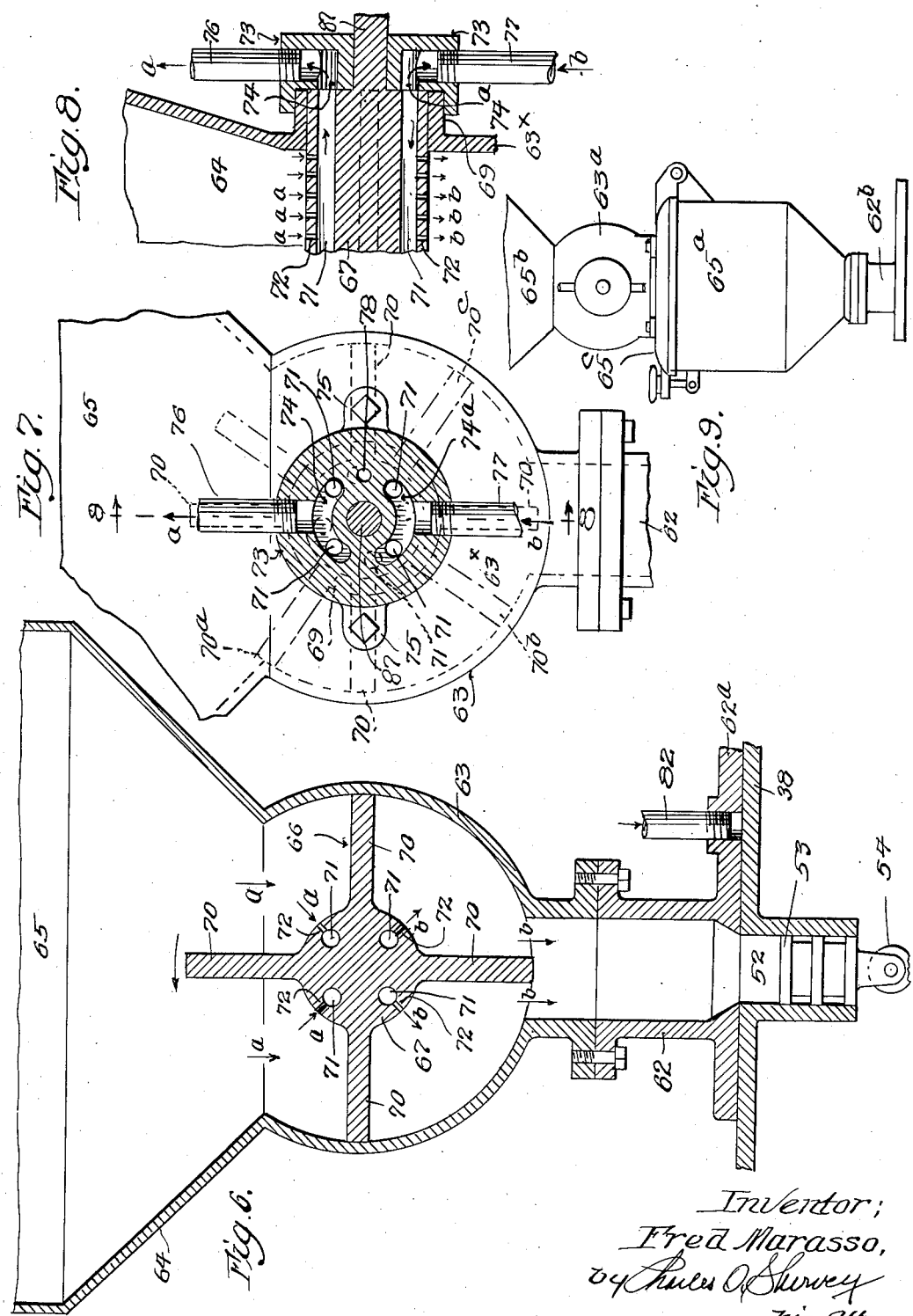
Feb. 18, 1941. F. MARASSO 2,231,934
COMBINED DIVIDER AND ROUNDER
Filed Jan. 25, 1940 3 Sheets-Sheet 3
Inventor;
Fred Marasso,
by Charles A. Hurvey
his Atty.

Patented Feb. 18, 1941

2,231,934

UNITED STATES PATENT OFFICE 2,231,934

COMBINED DIVIDER AND ROUNDER

Fred Marasso, Joliet, Ill., assignor to Union Machinery Company, Joliet, Ill., a corporation of Illinois Application January 25, 1940, Serial No. 315,460

14 Claims. (Cl. 107—4)

This invention relates to combined dividers and rounders and one of its objects is to provide, in a unitary structure, improved means for dividing a batch of dough into measured lumps and rounding up the lumps.

Another object is to provide in a combined divider and rounder a dough measuring or dividing member and a hollow, rotating, rounding-up member having an open bottom under which the measuring member travels and delivers the measured dough lumps to the inner rounding-up face of said rounding-up member.

Another object is to provide a rotating dough dividing member having measuring pockets circumferentially disposed about the same, together with improved means for feeding a batch of dough to the pockets, said feeding means operating under both minus and plus air pressure whereby to insure the proper loading of the measuring pockets.

Another object is to provide an open bottom rotating rounding-up member together with a rotating dough measuring table which contacts with the lower edge of the rotary rounding-up member and delivers the dough lumps thereto.

Other objects and advantages will appear in the course of this specification, and with said objects and advantages in view, this invention consists in the several novel features hereinafter fully set forth and claimed.

The invention is clearly illustrated in the drawings accompanying this specification in which:

Fig. 1 is a view, partly in side elevation and partly in central vertical longitudinal section, of a combined dough divider and rounder, embodying one form of the present invention.

Fig. 2 is a detail view, partly in elevation and partly in section, illustrating certain gearing for driving the rotating rounding-up member.

Fig. 3 is a plan, with a certain bracket partly broken away, and the dough feeding and loading means removed.

Fig. 4 is a detail view, partly in elevation and partly in cross section, taken on the line 4—4 of Fig. 3.

Fig. 5 is a view, partly in elevation and partly in vertical cross section, taken on the line 5—5 of Fig. 3.

Fig. 6 is an enlarged detail vertical cross section taken on the line 6—6, of Fig. 1.

Fig. 7 is a detail vertical cross section taken on the line 7—7 of Fig. 1.

Fig. 8 is a detail cross section taken on the line 8—8 of Fig. 7, and

Fig. 9 is a side elevation of a slightly modified form of dough feeding means upon a slightly reduced scale.

Referring to said drawings, and first to Figs. 1 to 8 inclusive, the reference character 10 designates a rectangular base desirably mounted upon rollers 11 and formed with a platform 13 which supports the mechanism of the machine.

Adjacent one end of the platform is a tank, 65, for containing the batch of dough which is to be divided into lumps that are to be rounded up into dough balls. Below the tank is the dough feeding and loading mechanism that loads the pockets of a rotating dividing or measuring member 38. In the pockets of the dividing member are plungers, that are actuated by an annular track 42 located below the measuring member. A rotating, hollow rounding-up member, 17, cooperates with a stationary spiral rounding-up member, 80, to round up the dough lumps. The rotating rounding-up member has an open bottom and the dividing or measuring member extends underneath the open bottom of the rotating rounding-up member and delivers the dough lumps to the inner rounding-up face thereof.

The measuring table 38 is provided with a number of downwardly extending walls, desirably of cylindrical form, which provide the measuring pockets, 52. Said pockets open through the top of the measuring table, and the bottoms of said pockets are formed by plungers 53, which are slidably guided in said pockets and have rollers 54 journaled in brackets which project down from the plungers. Said rollers 54 run upon the annular track and follow the plural line contour of the upper face thereof, whereby plungers occupy down positions when the rollers are traveling upon the low level of the track and are raised with their upper faces flush with the upper face of the measuring table when the rollers run upon the high level of the track.

Stationarily mounted in a boss 32 which extends down from the platform 13 is an annular track member 33 which is formed upon its lower side with a downwardly projecting hub 34 which fits in and is keyed to the boss 32, and is supported by adjustment screws 35, threadedly mounted in a block 36 bolted or otherwise secured to the lower edge of the boss 32. By properly manipulating the adjustment screws 35 the track member 33 may be raised or lowered to bring the upper face of the measuring table into contact with the lower edge of the rotating rounding-up member, or to provide a very slight clearance therebetween.

Rigidly secured in said hub 34 is an upright shaft 37 upon which the measuring table 38 is mounted. Said measuring table has a downwardly extending hub 39 which surrounds the shaft 37 and is provided with anti-friction bearings 40 at its lower end, which rest upon the web 41 of the track member, 33, and take up the end thrust of the measuring table.

The annular track 42 projects up from the web 41 of the track member 33, and said track supports the plungers, as has been explained. Said track 42 extends underneath the open bottom of the rotating rounding-up member and at said open bottom the track has an inclined face 43 leading from a low portion, 44, of the track to a high portion 45 thereof, as is best seen in Fig. 4. At the inclined part of the track it serves to raise the plungers and eject the dough from the pockets of the measuring table in position to encounter the inner rounding-up face of the rotary rounding-up member.

At the loading station of the machine, underneath the tank 65, the track 42 has a cut out portion or gap (see Fig. 5), which separates its high level from its low level, and at said gap is a vertically adjustable track section 46 which has upright downwardly projecting pins 47 that are guided for vertical movement in a boss 49 formed upon the web 41 of the track member 33. An adjustment screw 50 is threadedly mounted in said boss 49 and bears against the underside of the track section 46, and supports it. Said adjustment screw has a hand wheel on its lower end, whereby it may be manipulated to raise or lower said track section 46 and thereby regulate the contents of the measuring pockets.

Suitable means are provided for rotating the measuring table and said means desirably comprise a variable speed electric motor 55 mounted on the platform 13 and connected to the shaft 56 of a speed reduction gearing contained in a gear casing 57, mounted upon the base of the machine. Upon the driven shaft 58 of the speed reduction gearing is a gear wheel 59 which meshes with an annular rack 60 located at the periphery of the measuring table. With the use of a variable speed motor the measuring table may be rotated at any desirable speed relative to the speed of the rotating rounding-up member. Four measuring pockets are shown in the measuring table, but the number may be considerably increased, so as to deliver dough lumps to the rotating rounding up member at more frequent intervals so as to speed up the operation of the machine.

The feeding and loading mechanism is located above the track section 46, and loads the measuring pockets as they pass across said track section. Said feeding and loading mechanism will now be described.

Mounted upon a bracket 61 which is secured to and projects up from the platform 13 is a loading nozzle 62, the lower face of which contacts with the upper face of the measuring table, and has an arcuate apron 62a, which overlies the circular path taken by the pockets from the loading nozzle to the rotating rounding-up member. A pipe, 82, leading from a source of compressed air supply, is threaded in a hole in the apron a short distance from the nozzle and supplies compressed air to the dough in the pockets as they pass by the hole. The compressed air forces the dough and plunger down, causing the roller to run on the low level of the track. This brings the surface of the dough lump slightly below the lower surface of the apron and prevents it from rubbing thereon. Removably secured to the upper end of the nozzle 62 is a cylinder 63, the lower end of which opens to the interior of the nozzle 62 and the upper end of which terminates in the hopper-like bottom 64 of the tank or other container 65 for the batch of material. Co-axially disposed with respect to the cylinder 63 is a rotating dough advancing member or paddle wheel, 66, which is formed with a cylindrical hub 67 rotatably mounted in bosses 68, 69, that are cast upon the upright side walls, 63x, of the cylinder. Projecting from said cylindrical hub 67 are blades 70 which are equidistantly spaced around the hub with their outer edges arranged to contact with or nearly contact with the internal face of the cylindrical wall of the cylinder 63, and their side edges arranged to contact with the upright side walls 63x of the cylinder. The upper end of the cylinder is cut away as shown in Fig. 6, at a suitable distance above the hub 67 and the hopper-like bottom 64 of the tank joins the cylinder at the cut away portion thereof. It will be seen from an inspection of Fig. 6 that the blades rotate in the cylinder and also in the lower end of the hopper, and act to force material from the lower end of the hopper into the cylinder and discharge the same down into the loading nozzle 62, from which it is loaded into the measuring pockets. The paddle wheel is driven from gearing in the gear box 57a by a sprocket chain 83 trained around sprocket wheels 84, 85, mounted respectively on the driven shaft 86 of said gearing and the shaft 87 of the paddle wheel.

To insure proper loading of the measuring pockets a partial vacuum is preserved in the lower end of the hopper, whereby to aid the force of gravity to move the dough down into spaces between the blades 70 as they pass through the lower end of the hopper, and air pressure is provided in the lower portion of the cylinder to aid the dough advancing member in loading the pockets.

The pneumatic feeding means will now be described. The body of the hub at places between the blades 70 is bored inward from one end to provide air passages 71, and the wall of the hub is bored radially in line with said air passages to provide air ports 72, which form communicating ports between said air passages 71, and the spaces between the blades. Secured upon the boss 69 is a head or valve-casing 73 which is formed with arcuate ports 74, 74a, concentric with the axis of rotation of the hub 67, with which the air passages 71 communicate during portions of each revolution of the dough advancing member. The valve casing 73 is provided with ears 75 by means of which it is bolted to the side wall 63x of the cylinder 63, with the inner face of the valve casing 73 in neat contact with the end face of the hub 67 to provide an airtight joint therebetween. Leading from the arcuate port 74 is a pipe 76 which runs to a vacuum pump or other source of vacuum supply (not shown) and leading from the arcuate port 74a is a pipe 77 which runs to an air compressor or another source of air under pressure (not shown). A relief port 78 is provided in the valve casing, with which the air passages come into register at the proper time, to permit the escape of compressed air from the spaces between the blades, after it has served its purpose in the cylinder 63.

Rigidly mounted in a boss 12, which projects down from the platform 13 of the base, is an upright post 14, the upper end of which is secured in a spider-like bracket 15, bolted or otherwise secured to the top of the hereinafter described casing, 16. Rotatably mounted in the casing 16 is the hollow rotating rounding-up member 17, which is desirably of inverted frustroconical form as shown, and having its top and bottom open. Conveniently the rotating rounding-up member may be rotatably mounted on rollers 18, rotatably mounted upon brackets 19, cast integral with the wall of the casing 16. Said rollers 18 are disposed at an oblique angle with respect to the axis of rotation of the rotating rounding-up member and the latter has an annular flange 20 which rides upon the rollers 18. Below said rollers are other rollers 18a which are rotatably mounted on a web or bracket arms 21 and bear against an annular flange 22 formed upon the rotating rounding-up member near its lower end.

Any suitable number of rollers 18 and 18a may be provided around the rounding-up member, so as to guide and steady the same during its rotation. Means are provided for rotating the rounding-up member and as shown, said means comprise a motor 23 provided with suitable variable speed gearing 24, which has a pinion 25 mounted upon its drive shaft, and meshes with a gear wheel 26 fast upon a shaft 27, journaled in bearings 28, 29. The bearing 28 is mounted upon the platform 13 and the bearing 29 is formed upon the arm or web 21. Upon the upper end of the shaft 27 is a pinion 30 which meshes with an annular rack 31 formed upon or secured to the rotating rounding-up member.

Cooperating with the rotating rounding-up member is the stationary spiral rounding-up member 80, whose lower edge contacts with the inner rounding-up face from its lower to its upper edge. The spiral rounding-up member shown is of conventional form. It is supported by arms 81, having hubs clamped upon the upright post, 14.

The casing 16 above referred to is mounted upon the platform 13 and surrounds the rounding-up member. It is cut away to permit the hereinbefore described measuring table to extend underneath the open bottom of the rounding-up member.

In the operation of the machine a batch of dough is placed in the tank 65 and the machine is started. As the paddle wheel 66 rotates, the blades 70, while passing through the bottom of the hopper 64, force some of the dough into the spaces between them and as the open ends of the air passages 71 pass by the port 74, a partial vacuum is created in those spaces between the blades which are in communication with the interior of the hopper. As a consequence the suction created aids gravity in partially filling the spaces between the blades with dough. When the paddle wheel occupies the position shown in the dot and dash lines in Fig. 7, one of the blades (indicated by 70a) has just reached the cylindrical wall of the cylinder 63 and the air passageway for the space between said blade and the one in advance thereof (70b) has just come into communication with the air port 74a, which communicates with the air compressor. Compressed air is thereupon admitted to the space between the two blades 70a, 70b, but it has also been previously admitted to the space between the blades 70b, 70c, and acts to force the dough from the cylinder down through the nozzle 62 and into the measuring pocket which happens to be passing by the open end of the nozzle.

As the measuring table rotates, the roller 54 of the plunger in the pocket below the nozzle, runs off the track section 46 and as the pocket passes the end of the compressed air pipe 82, the dough and plunger are suddenly forced down until the roller engages the low level face 44 of the annular track (see Fig. 5), thereby lowering the top surface of the dough lump slightly below the bottom face of the apron and preventing it from being dragged along the same.

The continued rotation of the measuring table brings each pocket under the open bottom of the rotating rounding-up member and as a pocket passes along said open bottom, the plunger roller 54 rides up the inclined face 43 of the annular track, thereby raising the plunger, bringing its upper surface flush with the upper surface of the measuring table, and ejecting the dough lump from the pocket before the dough lump encounters the inner rouding-up face of the rotating rounding-up member 17 (see Fig. 3). The rounding-up member thereupon carries the dough lump into the trough between the stationary spiral rounding-up member and the rotating rounding-up member and rolls it up through said trough, rounding up the dough lump as is well understood and discharging it from the top of the stationary spiral rounding-up member.

The arrows adjacent the rotating members indicate their direction of rotation, and in Figs. 6 and 8 the arrows $a$ indicate the direction of the movement of the air on the suction side of the paddle wheel and the arrows $b$ indicate the direction of movement of the air on the compressed air side thereof.

In the modified form illustrated in Fig. 9, a tank or other container, 65a, is interposed between the cylinder 63a, and the nozzle 62b, and a hopper or other dough receiving tank member 65b is located above the cylinder. The tank or container 65a is provided with a cover 65c hinged thereto and adapted to be fastened thereto with an air tight joint. In this form of the invention the cover 65c may be readily opened to obtain access to the interior of the adjacent parts for the purpose of cleaning them.

The pneumatic action is the same in this form of the device as in the preferred form and the compressed air forces the dough from the spaces of the paddle wheel into the tank 65a and from thence through the nozzle 62b into the measuring pockets as they pass underneath the nozzle.

I claim as new and desire to secure by Letters Patent:

1. In a combined divider and rounder, the combination with a rotating, hollow rounding-up member open at its top and bottom and having an inner rounding up face, a stationary spiral rounding-up member contacting with the inner face of the rotating rounding-up member, and supporting means upon which said rotating rounding-up member rides, said supporting means being disposed laterally of the rotating rounding-up member, of a rotating measuring member having dough measuring pockets with plungers therein, said measuring member being located in part beneath the open bottom of the rotating rounding-up member and contacting with the lower edge thereof, dough loading means for loading said measuring pockets, and means to actuate the plungers, having a plunger raising element disposed beneath the open bottom of the rotating rounding-up member and serving to eject the dough while the pockets are traveling below the open bottom of the rotating rounding-up member and approaching said inner rounding-up face thereof whereby to deliver the dough lumps thereto.

2. The combination with a rotating, hollow, open top and bottom rounding-up member, having an internal rounding-up face, a stationary spiral rounding-up member contacting with the internal face thereof, and supporting members upon which the rotating rounding-up member rides, said supporting members being disposed laterally of the rotating rounding-up member, of a rotating dough measuring member having measuring pockets arranged circumferentially about the same, and adapted to receive dough, plungers in said pockets and means to actuate the plungers to eject dough from the pockets, said measuring member rotating on an axis non-concentric with respect to the axis of the rotating rounding-up member, with its pockets traveling across the open bottom of the latter, and said plunger actuating means having an element disposed beneath the open bottom of said rotating rounding-up member and arranged to move the plungers flush with the face of the measuring member while the pockets thereof travel past said open bottom of the rotating rounding-up member, whereby rotation of the measuring member carries the ejected dough lumps into contact with the inner rounding-up face of the rotating rounding-up member in advance of the stationary spiral rounding-up member.

3. The combination with a rotating, hollow, open top and bottom rounding-up member of inverted frustro-conical form, a stationary spiral rounding-up member contacting with the internal face thereof, and supporting means upon which the rotating rounding-up member rides, and disposed laterally thereof, of a rotating dough measuring member having measuring pockets arranged circumferentially about the same, and adapted to receive dough, plungers in said pockets and means to actuate the plungers to eject dough from the pockets, said measuring member rotating on an axis non-concentric with respect to the axis of the rotating rounding-up member, with its pockets traveling across the open bottom of the latter and said plunger actuating means having an element disposed beneath the open bottom of the rotating rounding-up member and arranged to move the plungers flush with the face of the measuring member while the pockets travel past said open bottom of the rotating rounding-up member, whereby rotation of the measuring member carries the ejected dough lumps into contact with the inner rounding-up face of the rotating rounding-up member in advance of the stationary spiral rounding-up member.

4. The combination with a rotating, hollow, open top and bottom rounding-up member and a stationary spiral rounding-up member contacting with the internal face thereof, of a rotating dough measuring table extending partly under the open bottom of the rotating rounding-up member and having dough measuring pockets arranged circumferentially about the same and adapted to receive dough, plungers in said pockets, an annular track upon which the plungers travel, said track being formed with a low level face and a high level face, and an inclined face connecting the low with the high level faces, and disposed below the open bottom of the rotating dough rounding-up member.

5. The combination with a rotating, hollow, open top and bottom rounding-up member and a stationary spiral rounding-up member contacting with the internal face thereof, of a rotating dough measuring table extending partly under the open bottom of the rotating rounding-up member and having dough measuring pockets arranged circumferentially about the same and adapted to receive dough, plungers in said pockets, a stationary track member having an annular track located below the measuring table, and formed with low and high level faces and an inclined face connecting said low and high level faces below the open bottom of the rotating rounding-up member, means to rotatively mount the measuring table on the track member, and means affording vertical adjustment for said track member, whereby to raise the track, and therewith raise the measuring table into contact with the lower edge of the rotary rounding-up member.

6. The combination with a rotating, hollow, open top and bottom rounding-up member and a stationary spiral rounding-up member contacting with the internal face thereof, of a rotating dough measuring table having dough measuring pockets arranged circumferentially about the same and adapted to receive dough, plungers in said pockets, a vertically adjustable track member upon which said measuring table is rotatively mounted, said track member having an annular sectional plunger actuating track upon which the plungers travel, a track section and means for adjusting said track section vertically to thereby increase or decrease the capacity of the measuring pockets.

7. The combination of a dough receiving tank, a cylinder opening thereto at one side of its axis, a loading nozzle opening to said cylinder at the opposite side of its axis, a bladed dough advancing member rotating in said cylinder, air valve means having a port for establishing communication between one part of the cylinder and the tank, whereby suction may be applied to said part of the cylinder, said valve means having also a port arranged to establish communication between the other portion of the cylinder and a source of compressed air.

8. The combination of a dough receiving tank, a cylinder opening thereto at one side of its axis, and a loading nozzle opening to said cylinder at the opposite side of its axis, a bladed dough advancing member rotating in said cylinder, there being air passages providing communication with the space between the blades of the dough advancing member, a valve member having a suction exhaust port and a compressed air inlet port with which said air passages alternately register, whereby suction is applied to the spaces between the blades while opening to the tank, and compressed air is applied to said spaces while opening to said loading nozzle, a vacuum supply pipe opening to said suction exhaust port, and a compressed air pipe opening to said compressed air inlet port.

9. The combination of a dough receiving tank, a cylinder opening thereto, at one side of its axis, and a loading nozzle opening to said cylinder at the opposite side of its axis, a paddle wheel rotating in said cylinder, said paddle wheel having a hub with blades projecting therefrom and providing spaces therebetween for the reception of dough from the tank, there being air passages in said hub providing communication with said spaces, a valve member having a suction exhaust port and a compressed air inlet port with which said air passages alternately register, whereby suction is applied to the spaces between the blades while opening to the tank, and compressed air is applied to said spaces while opening to said loading nozzle, a vacuum supply pipe opening to said suction exhaust port and a compressed air pipe opening to said compressed air inlet port.

10. Dough loading means for the measuring pockets of a dough dividing member, comprising mechanical dough advancing means, and valve means for establishing communication between one side of said dough advancing means and a source of vacuum supply and for establishing communication between the other side of said dough advancing means and a source of compressed air supply.

11. Dough loading means for the measuring pockets of a dough measuring table comprising a cylinder, a bladed wheel rotating in said cylinder, air passages leading from the spaces between the blades, and valve means for establishing communication between said air passages on one side of the axis of the wheel and a source of vacuum supply, and establishing communication between the air passages on the other side of said axis with a source of compressed air supply.

12. In dough loading means for the measuring pockets of a dough measuring table comprising a nozzle contacting with the table and having an apron overlying the path of movement of the pockets, plungers in said pockets, a plunger actuating track having one face for supporting the plungers in loading position and a lower face upon which the plungers travel to another station, and a compressed air pipe opening through said apron, for supplying compressed air to the contents of the pockets while passing the discharge end of the compressed air pipe, whereby to depress the surface of the contents of the pockets.

13. Dough loading means for the measuring pockets of a measuring table comprising a receptacle for receiving dough, a combined mechanical and pneumatic means for withdrawing the dough from said receptacle, a tank into which the dough is discharged from said mechanical means under air pressure, and a nozzle on one end of the tank through which the dough is loaded into the measuring pockets.

14. Dough loading means for the measuring pockets of a measuring table comprising a receptacle for receiving dough, a combined mechanical and pneumatic means for withdrawing the dough from said receptacle, a tank into which the dough is discharged from said mechanical means under air pressure, and having an openable cover furnishing access to the interior of the tank, and a loading nozzle on the end of the tank.

FRED MARASSO.